(12) United States Patent
Jain et al.

(10) Patent No.: US 7,478,407 B2
(45) Date of Patent: Jan. 13, 2009

(54) SUPPORTING MULTIPLE APPLICATION PROGRAM INTERFACES

(75) Inventors: Vikas Jain, Sunnyvale, CA (US); Michele C. Lee, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 668 days.

(21) Appl. No.: 10/325,465

(22) Filed: Dec. 20, 2002

(65) Prior Publication Data

US 2004/0010791 A1     Jan. 15, 2004

Related U.S. Application Data

(60) Provisional application No. 60/395,152, filed on Jul. 11, 2002.

(51) Int. Cl.
*G06F 9/44* (2006.01)

(52) U.S. Cl. .................. 719/328; 719/311; 726/3

(58) Field of Classification Search ............... 719/310, 719/318, 328, 331, 332, 311; 717/164; 713/191; 707/102; 709/203; 726/3, 227
See application file for complete search history.

(56) References Cited

U.S. PATENT DOCUMENTS

| | | | |
|---|---|---|---|
| 5,010,478 A | 4/1991 | Deran | |
| 5,077,666 A | 12/1991 | Brimm et al. | |
| 5,664,154 A | 9/1997 | Purcell et al. | |
| 5,713,023 A | 1/1998 | Hayata et al. | |
| 5,721,900 A | 2/1998 | Banning et al. | |
| 5,724,595 A | 3/1998 | Gentner | |
| 5,732,408 A | 3/1998 | Takahashi | |
| 5,734,837 A | 3/1998 | Flores et al. | |
| 5,754,939 A | 5/1998 | Herz et al. | |
| 5,815,703 A * | 9/1998 | Copeland et al. ............ 707/102 |
| 5,848,273 A | 12/1998 | Fontana et al. | |
| 5,944,824 A | 8/1999 | He | |
| 6,014,666 A * | 1/2000 | Helland et al. ................. 707/9 |
| 6,044,465 A | 3/2000 | Dutcher et al. | |
| 6,078,747 A * | 6/2000 | Jewitt ........................ 717/164 |
| 6,131,120 A | 10/2000 | Reid | |

(Continued)

OTHER PUBLICATIONS

Mc.Lellan et al. "Building More Usable APIs" 1998 IEEE, pp. 78-86.*

(Continued)

*Primary Examiner*—Van H Nguyen
(74) *Attorney, Agent, or Firm*—Townsend and Townsend and Crew LLP (57) ABSTRACT

Technology for supporting multiple application program interfaces. A main application identifies an application program interface to employ with a program outside of the main program, such as a plug-in. In one instance, the main application employs an application program interface registration list to identify the proper application program interface to use with a desired program—allowing the proper application program interface to be identified before interacting with the desired program. The registration list includes a set of entries. Each entry identifies a program and a corresponding application program interface to use with the program. The main application accesses an entry in the registration list for the desired program to identify the corresponding application program interface. When an event occurs, the main application accesses an event catalog entry to identify a program that corresponds to the event and the application program interface that corresponds to the program.

63 Claims, 6 Drawing Sheets

U.S. PATENT DOCUMENTS

| | | | |
|---|---|---|---|
| 6,134,634 A | 10/2000 | Marshall, Jr. et al. | |
| 6,138,104 A | 10/2000 | Marchak et al. | |
| 6,141,778 A | 10/2000 | Kane et al. | |
| 6,145,003 A | 11/2000 | Sanu et al. | |
| 6,151,531 A | 11/2000 | Frankel et al. | |
| 6,158,010 A | 12/2000 | Moriconi et al. | |
| 6,182,142 B1 | 1/2001 | Win et al. | |
| 6,195,710 B1* | 2/2001 | Borgendale et al. | 719/328 |
| 6,208,986 B1 | 3/2001 | Schneck et al. | |
| 6,212,558 B1 | 4/2001 | Antur et al. | |
| 6,253,202 B1 | 6/2001 | Gilmour | |
| 6,253,239 B1 | 6/2001 | Shklar et al. | |
| 6,253,257 B1* | 6/2001 | Dundon | 719/331 |
| 6,256,737 B1 | 7/2001 | Bianco et al. | |
| 6,256,739 B1 | 7/2001 | Skopp et al. | |
| 6,260,077 B1* | 7/2001 | Rangarajan et al. | 719/328 |
| 6,266,420 B1 | 7/2001 | Langford et al. | |
| 6,278,993 B1 | 8/2001 | Kumar et al. | |
| 6,279,043 B1* | 8/2001 | Hayward et al. | 719/328 |
| 6,314,470 B1* | 11/2001 | Ward et al. | 719/328 |
| 6,323,881 B1 | 11/2001 | Broulik | |
| 6,335,927 B1 | 1/2002 | Elliott et al. | |
| 6,338,097 B1 | 1/2002 | Krenzke et al. | |
| 6,343,287 B1 | 1/2002 | Kumar et al. | |
| 6,347,312 B1 | 2/2002 | Byrne et al. | |
| 6,349,306 B1 | 2/2002 | Malik et al. | |
| 6,353,929 B1 | 3/2002 | Houston | |
| 6,366,913 B1 | 4/2002 | Fitler, Jr. et al. | |
| 6,401,101 B1 | 6/2002 | Britton et al. | |
| 6,401,138 B1* | 6/2002 | Judge et al. | 719/328 |
| 6,415,368 B1 | 7/2002 | Glance et al. | |
| 6,434,531 B1 | 8/2002 | Lancelot et al. | |
| 6,442,567 B1 | 8/2002 | Retallick et al. | |
| 6,490,655 B1 | 12/2002 | Kershaw | |
| 6,499,023 B1 | 12/2002 | Dong et al. | |
| 6,523,022 B1 | 2/2003 | Hobbs | |
| 6,529,941 B2 | 3/2003 | Haley et al. | |
| 6,539,379 B1 | 3/2003 | Vora et al. | |
| 6,549,941 B1 | 4/2003 | Jaquith et al. | |
| 6,611,840 B1 | 8/2003 | Baer et al. | |
| 6,647,383 B1 | 11/2003 | August et al. | |
| 6,671,695 B2 | 12/2003 | McFadden | |
| 6,671,745 B1* | 12/2003 | Mathur et al. | 719/328 |
| 6,701,368 B1 | 3/2004 | Chennapragada et al. | |
| 6,704,807 B1* | 3/2004 | Mathur et al. | 719/328 |
| 6,704,873 B1 | 3/2004 | Underwood | |
| 6,708,170 B1 | 3/2004 | Byrne et al. | |
| 6,721,804 B1 | 4/2004 | Rubin et al. | |
| 6,732,178 B1 | 5/2004 | Van Horne et al. | |
| 6,732,179 B1* | 5/2004 | Brown et al. | 709/229 |
| 6,741,853 B1 | 5/2004 | Jiang et al. | |
| 6,757,720 B1 | 6/2004 | Wechsler, Jr. | |
| 6,760,750 B1 | 7/2004 | Boneh et al. | |
| 6,768,988 B2 | 7/2004 | Boreham et al. | |
| 6,769,000 B1 | 7/2004 | Akhtar et al. | |
| 6,785,686 B2 | 8/2004 | Boreham et al. | |
| 6,785,713 B1* | 8/2004 | Freeman et al. | 709/208 |
| 6,785,726 B1* | 8/2004 | Freeman et al. | 709/227 |
| 6,839,701 B1 | 1/2005 | Baer et al. | |
| 6,880,086 B2* | 4/2005 | Kidder et al. | 713/191 |
| 6,948,135 B1 | 9/2005 | Ruthfield et al. | |
| 7,013,435 B2 | 3/2006 | Gallo et al. | |
| 7,013,469 B2* | 3/2006 | Smith et al. | 719/328 |
| 7,035,926 B1 | 4/2006 | Cohen et al. | |
| 7,039,871 B2 | 5/2006 | Cronk | |
| 7,069,330 B1 | 6/2006 | McArdle et al. | |
| 7,076,784 B1* | 7/2006 | Russell et al. | 719/315 |
| 7,114,037 B2 | 9/2006 | Agarwal et al. | |
| 7,120,914 B1 | 10/2006 | Manthos et al. | |
| 7,213,249 B2 | 5/2007 | Loo et al. | |
| 7,216,163 B2 | 5/2007 | Sinn | |
| 7,231,661 B1 | 6/2007 | Villavicencio | |
| 7,249,369 B2 | 7/2007 | Knouse | |
| 7,266,595 B1* | 9/2007 | Black et al. | 709/223 |
| 7,340,447 B2 | 3/2008 | Ghatare | |
| 7,349,912 B2 | 3/2008 | Delany et al. | |
| 7,363,339 B2 | 4/2008 | Delany et al. | |
| 7,380,008 B2 | 5/2008 | Teng et al. | |
| 7,398,311 B2 | 7/2008 | Joshi et al. | |
| 2002/0032684 A1 | 3/2002 | Kobayashi et al. | |
| 2002/0038306 A1 | 3/2002 | Griffin et al. | |
| 2002/0049749 A1 | 4/2002 | Helgeson et al. | |
| 2002/0067370 A1 | 6/2002 | Forney et al. | |
| 2002/0073180 A1 | 6/2002 | Dewhurst et al. | |
| 2002/0083178 A1 | 6/2002 | Brothers | |
| 2002/0138763 A1 | 9/2002 | Delany et al. | |
| 2002/0161766 A1 | 10/2002 | Lawson et al. | |
| 2003/0028752 A1 | 2/2003 | Fu et al. | |
| 2003/0037052 A1 | 2/2003 | Kitain et al. | |
| 2003/0055762 A1 | 3/2003 | Holt | |
| 2003/0055806 A1 | 3/2003 | Wong et al. | |
| 2003/0065558 A1 | 4/2003 | Shaw et al. | |
| 2003/0083908 A1 | 5/2003 | Steinmann | |
| 2003/0088708 A1 | 5/2003 | Lewallen | |
| 2003/0097380 A1 | 5/2003 | Mulhern et al. | |
| 2003/0105733 A1 | 6/2003 | Boreham et al. | |
| 2003/0105742 A1 | 6/2003 | Boreham et al. | |
| 2003/0115196 A1 | 6/2003 | Boreham et al. | |
| 2003/0115548 A1 | 6/2003 | Melgar | |
| 2003/0120593 A1 | 6/2003 | Bansal et al. | |
| 2003/0120601 A1 | 6/2003 | Ouye et al. | |
| 2003/0144982 A1 | 7/2003 | Reulein et al. | |
| 2003/0145074 A1 | 7/2003 | Penick | |
| 2003/0204481 A1 | 10/2003 | Lau | |
| 2003/0208397 A1 | 11/2003 | VanDusen | |
| 2003/0217127 A1 | 11/2003 | Sinn | |
| 2003/0217333 A1 | 11/2003 | Smith et al. | |
| 2004/0003351 A1 | 1/2004 | Sommerer et al. | |
| 2004/0024762 A1 | 2/2004 | Agarwal et al. | |
| 2005/0240490 A1 | 10/2005 | Mackey | |

OTHER PUBLICATIONS

Stets et al. "Component-Based APIs for Versioning and Distributed Applications" 1999 IEEE, pp. 54-61.*
Kim "APIs for Real-Time Distributed Object Programming" 2000 IEEE, pp. 72-80.*
U.S. Appl. No. 10/314,888, Office Action dated Jan. 26, 2006, 31 pages.
U.S. Appl. No. 10/327,607, Office Action dated Feb. 13, 2006, 5 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,914, Office Action dated Aug. 1, 2005, 15 pages.
U.S. Appl. No. 10/354,914, Final Office Action dated Feb. 10, 2006, 16 pages.
Leon, McAfee's NetTools Promises to Ease Network Desktop Diagnosis, InfoWorld, San Mateo, Jul. 24, 1995, vol. 17, Iss. 30, p. 53.
Cooney, IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8, pp. 35-39.
Clear Trust, Unified Access Management, Securant Technologies, Inc., pp. 1-23, 1997.
SiteMinder Agent Operations, Verson 4.0, Netegrity Inc., 1997.
SiteMinder Deployment Guide, Version 4.0, Netegrity Inc., 1997.
SiteMinder Policy Server Operations Guide, Version 4.0, Netegrity Inc., 1997.
SiteMinder Developer's API Guide, Version 4.0, Netegrity Inc., 1997.
SiteMinder Installation Guide, Version 4.0, Netegrity Inc., 1997.
U.S. Appl. No. 09/570,276, Office Action dated Nov. 14, 2006, 28 pages.
U.S. Appl. No. 10/314,888, Office Action dated Feb. 9, 2007, 34 pages.
U.S. Appl. No. 10/345,879, Office Action dated Oct. 5, 2006, 30 pages.
Saba—Products, Saba Enterprise 5, dated 1997-2006, 2 pages.
Saba—Company, dated 1997-2006, 1 page.
Saba—Solutions, Competency-Driven HCM, dated 1997-2006, 1 page.
Saba—Talent, dated 1997-2006, 2 pages.
Saba—Collaboration, dated 1997-2006, 1 page.
U.S. Appl. No. 10/314,888, Office Action dated Jul. 26, 2006, 26 pages.
U.S. Appl. No. 10/327,607, Office Action dated Apr. 18, 2006, 33 pages.
U.S. Appl. No. 10/328,920, Office Action dated May 31, 2006, 20 pages.
U.S. Appl. No. 10/354,913, Office Action dated May 12, 2005, 16 pages.
U.S. Appl. No. 10/354,914, Final Office Action dated Apr. 5, 2007, 9 pages.
U.S. Appl. No. 10/952,592, Final Office Action dated May 3, 2007, 54 pages.
U.S. Appl. No. 10/327,607, Office Action dated Apr. 30, 2007, 31 pages.
Jung-Jang Jeng, "An Approach to Designing Reusable Service Frameworks via Virtual Service Machine," ACM, May 18-20, 2001, pp. 58-66.
Nenad Medvidovic et al., "Modeling Software Architectures in the Unified Modeling Language," ACM, Jan. 2002, pp. 2-57.
U.S. Appl. No. 10/314,888, Advisory Action dated May 30, 2008, 3 pages.
U.S. Appl. No. 10/327,607, Notice of Allowance dated Aug. 6, 2008, 36 pages.
U.S. Appl. No. 10/345,879, Notice of Allowance dated May 19, 2008, 6 pages.
U.S. Appl. No. 10/354,913, Notice of Allowance dated Jun. 12, 2008, 8 pages.
U.S. Appl. No. 11/684,796, Advisory Action dated Aug. 13, 2008, 4 pages.
U.S. Appl. No. 11/684,796, Final Office Action dated Jun. 17, 2008, 22 pages.
U.S. Appl. No. 10/314,888, Office Action dated Jul. 27, 2007, 37 pages.
U.S. Appl. No. 10/314,888, Final Office Action dated Feb. 22, 2008, 37 pages.
U.S. Appl. No. 10/327,607, Final Office Action dated Oct. 10, 2006, 33 pages.
U.S. Appl. No. 10/327,607, Final Office Action dated Nov. 16, 2007, 35 pages.
U.S. Appl. No. 10/327,607, Advisory Action dated Feb. 4, 2008, 3 pages.
U.S. Appl. No. 10/328,920, Notice of Allowance dated Dec. 5, 2006, 8 pages.
U.S. Appl. No. 10/345,873, Notice of Allowance dated Jul. 6, 2006, 6 pages.
U.S. Appl. No. 10/345,879, Final Office Action dated May 17, 2007, 39 pages.
U.S. Appl. No. 10/345,879, Advisory Action dated Jul. 27, 2007, 5 pages.
U.S. Appl. No. 10/345,879, Office Action dated Oct. 31, 2007, 35 pages.
U.S. Appl. No. 10/354,913, Final Office Action dated Oct. 31, 2006, 15 pages.
U.S. Appl. No. 10/354,913, Final Office Action dated Apr. 18, 2007, 20 pages.
U.S. Appl. No. 10/354,913, *Ex Parte Quayle Action* dated Nov. 1, 2007, 7 pages.
U.S. Appl. No. 10/354,913, Office Action dated Feb. 7, 2008, 10 pages.
U.S. Appl. No. 10/354,914, Office Action dated Sep. 22, 2006, 8 pages.
U.S. Appl. No. 10/354,914, Notice of Allowance dated Mar. 12, 2008, 11 pages.
U.S. Appl. No. 11/684,796, Office Action dated Nov. 27, 2007, 25 pages.

* cited by examiner

SUPPORTING MULTIPLE APPLICATION PROGRAM INTERFACES

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to U.S. patent application Ser. No. 09/999,074, entitled "Workflows With Associated Processes," filed on Nov. 30, 2001, and incorporated herein by reference in its entirety.

BACKGROUND OF THE INVENTION

1. Field of the Invention

The present invention is directed to technology for supporting multiple versions of an application program interface.

2. Description of the Related Art

With the growth of the Internet, the use of networks, and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

In operation, Identity System applications frequently invoke client plug-in programs that reside outside of the Identity System. Each client program performs an operation that is not integrated into the Identity System. For example, the Identity System may invoke a client program to perform encryption and decryption.

The Identity System interacts with each client program through an application program interface ("API"). The application program interface defines how the Identity System and client program will exchange communications. For example, the application program interface may specify the format, fields, and protocols to employ when passing data between the Identity System and a client program. The concept of application program interfaces is well known in the art.

In some instances, it may be useful for an Identity System to support more than one application program interface. For example, a new version of an Identity System may support the following: 1) an old API that is compatible with a prior version of the Identity System, and 2) a new API that takes advantage of additional functionality in the new Identity System. This provides users with a backward compatible API for existing client programs and an API with enhanced capability for newly developed client programs.

It is desirable for the Identity System to support the appropriate application program interface to use with each client program. One existing approach provides a single application program interface with the ability to support both a current version of an API and prior versions of the API. This solution becomes unmanageable as the number of API revisions grows. In another solution, information exchanged between a main application and a client program includes a header that identifies the API. This solution has the drawbacks of adding overhead and requiring the client program to initiate communication with the main application to identify the API. Improved support for switching between application program interfaces would be beneficial.

Some Identity System users also employ an Access Systems. An Access System provides for the authentication and authorization of users attempting to access resources. For efficiency purposes, there is an advantage to integrating the Identity System and the Access System. For example, both systems may utilize a single set of group objects that identify user membership in various groups. Additionally, integrating the Identity System and the Access System allows for single-sign-on functionality across multiple resources. Thus, there is also a need to support multiple application program interfaces in an Access Systems and integrated Identity/Access Systems. Systems other than Identity and Access Systems can also benefit from supporting multiple application program interfaces.

SUMMARY OF THE INVENTION

The present invention, roughly described, pertains to technology for supporting multiple application program interfaces. In one embodiment, a main application employs a registration list to identify the proper application program interface to use with a desired program—a program outside of the main application, such as a plug-in. The registration list can reside in one self-contained location, such as a configuration file, or be distributed among various locations, like a set of database entries. This allows the main application to identify the proper API for the desired application before interacting with the desired program, so that the API can be employed from the outset.

In one embodiment, the registration list includes a set of entries. Each entry identifies a program and a corresponding API to use with the program. Prior to interacting with the desired program, the main application accesses an entry in the registration list for the desired program to identify the corresponding API. The main application then uses the identified API to invoke and interact with the desired program.

In one implementation, the registration list is an event catalog with each entry correlating an event to a program and the API used by the program. When an event occurs, the main application accesses an event catalog entry to identify a program that corresponds to the event and the API that corresponds to the program. The main application then interacts with the program using the corresponding API. Those skilled in the art understand that any type of condition or occurrence can trigger an event. For example, the reception of data can be an event that triggers a data decryption program.

Various embodiments of the present invention are incorporated in an Identity, Access, or integrated Identity/Access System. This enables the applications in these systems to support multiple application program interfaces without using version identification headers or a single cumbersome API to support multiple modes of operation. Further embodiments, however, are employed in systems other than Identity, Access, and integrated Identity/Access Systems.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

DETAILED DESCRIPTION

Figure 1:
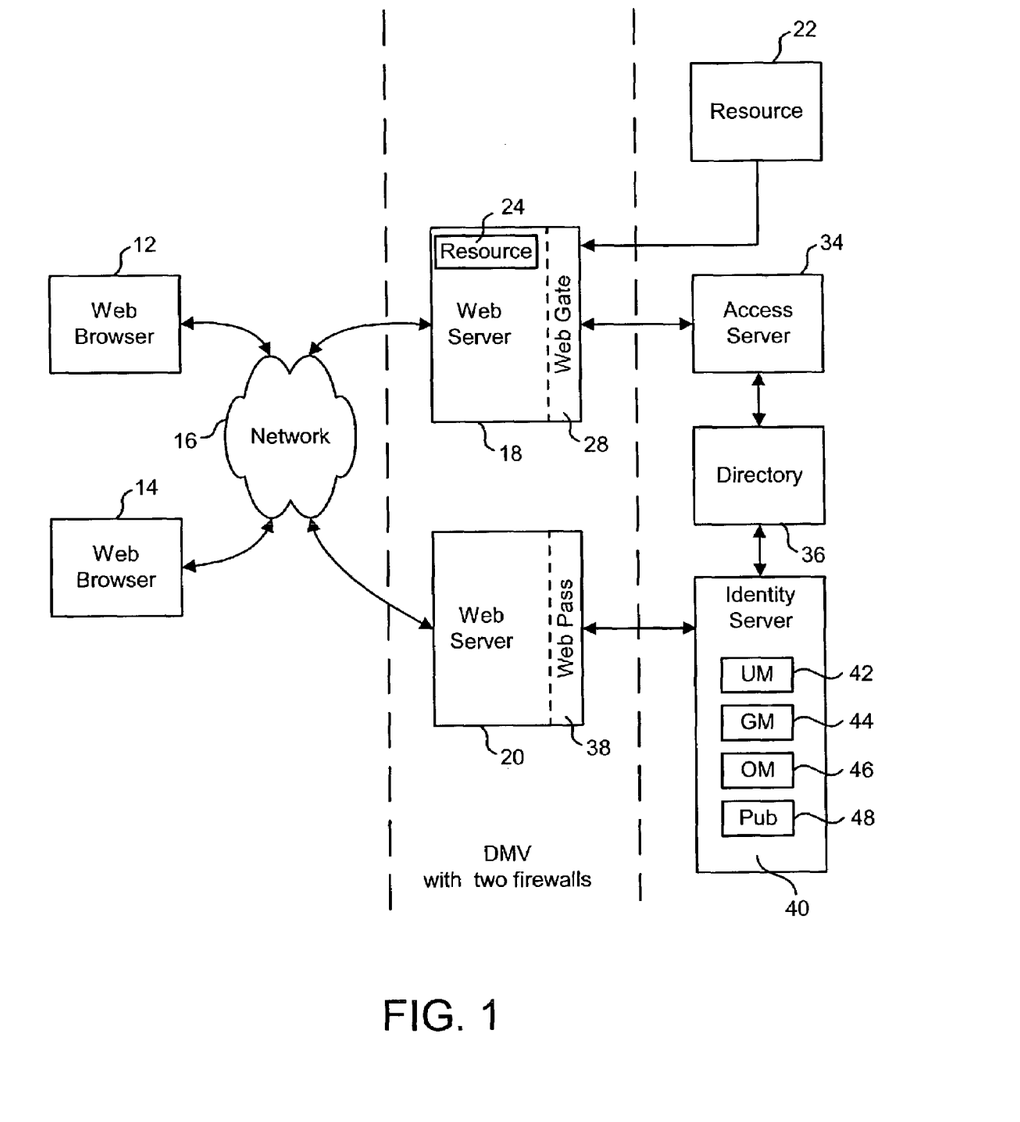
FIG. 1 is a block diagram depicting the components of one embodiment of the present invention.

FIG. 1 depicts an example of an access management system that provides identity management services and/or access management services for a network. The identity management portion of the system (hereinafter "the Identity System") manages identity profiles, while the access management portion of the system (hereinafter "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
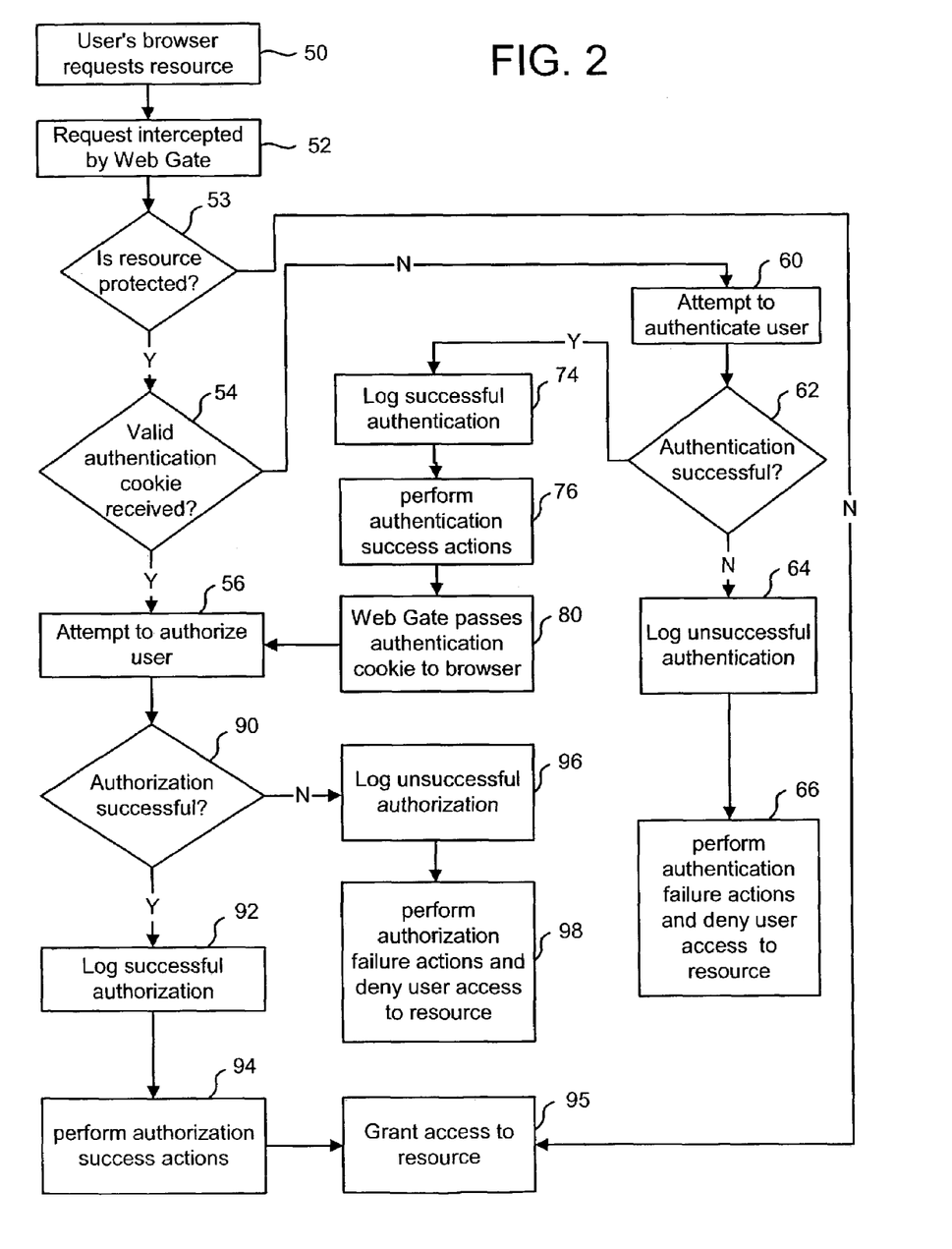
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/999,074, "Workflows With Associated Processes," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
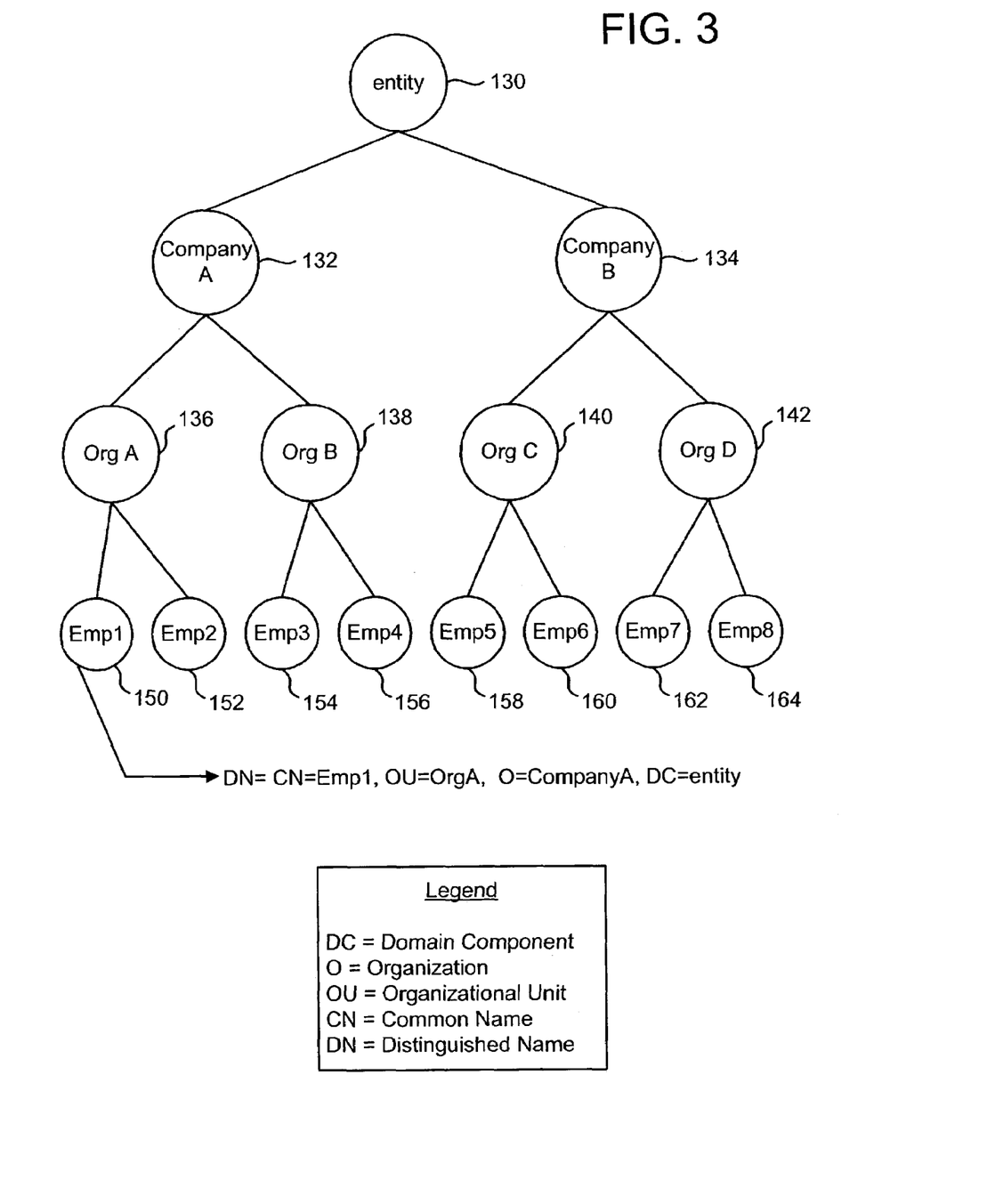
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:

| | |
|---|---|
| DC = | Domain Component |
| O = | Organization |
| OU = | Organizational Unit |
| CN = | common name. |

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
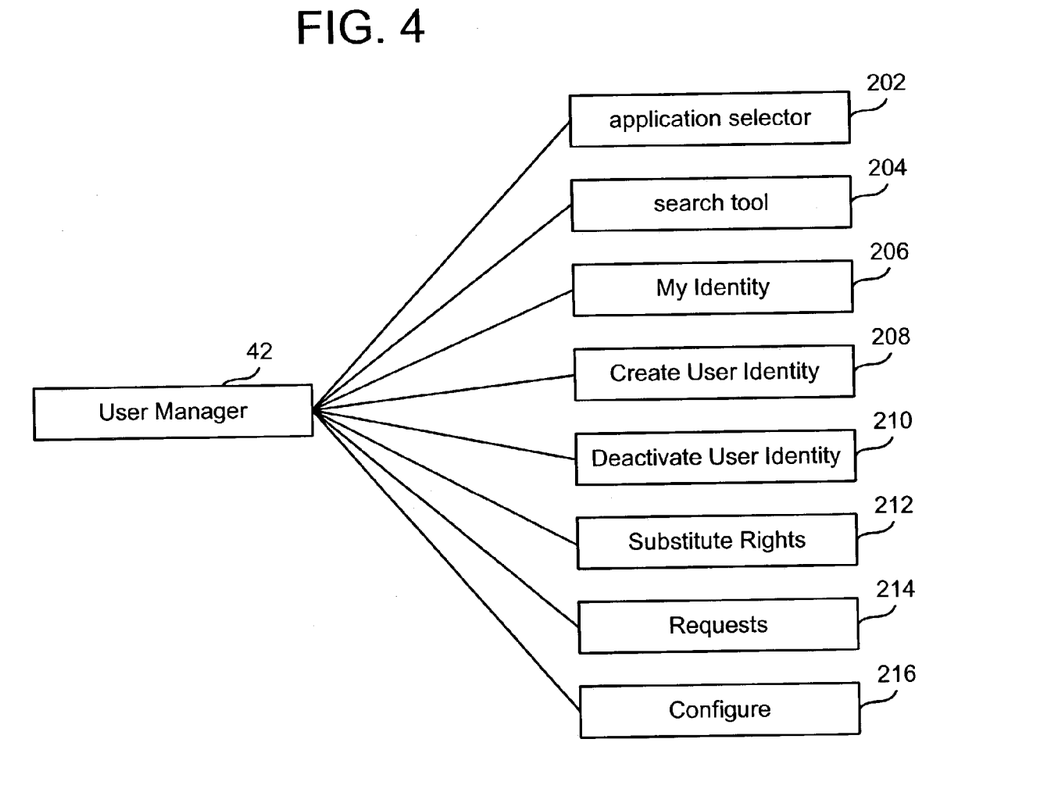
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

Figure 5:
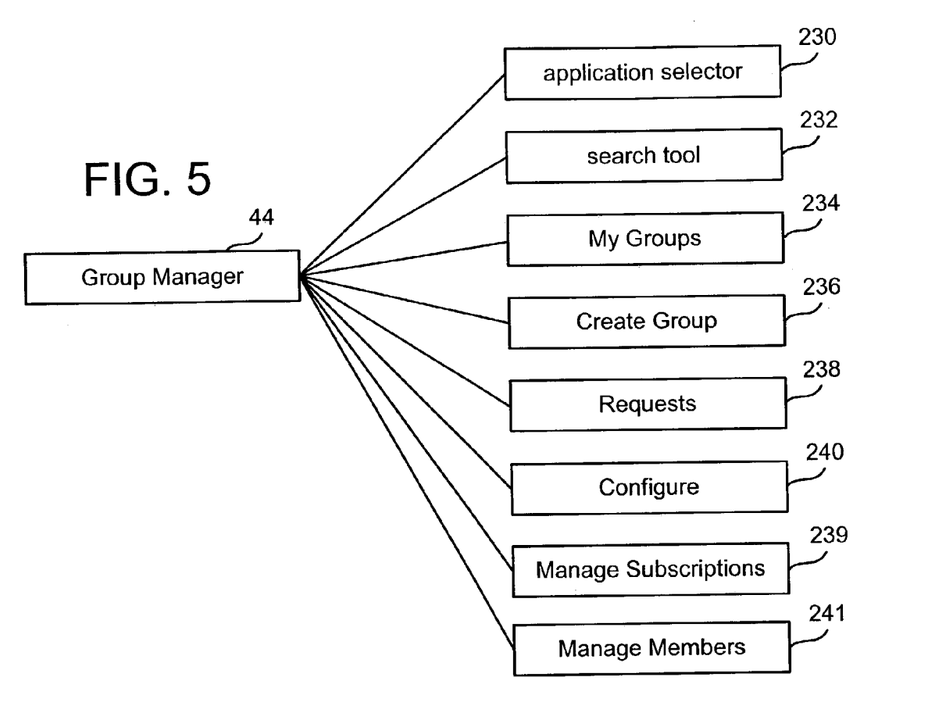
FIG. 5 is a block diagram depicting the Group Manager.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

Figure 6:
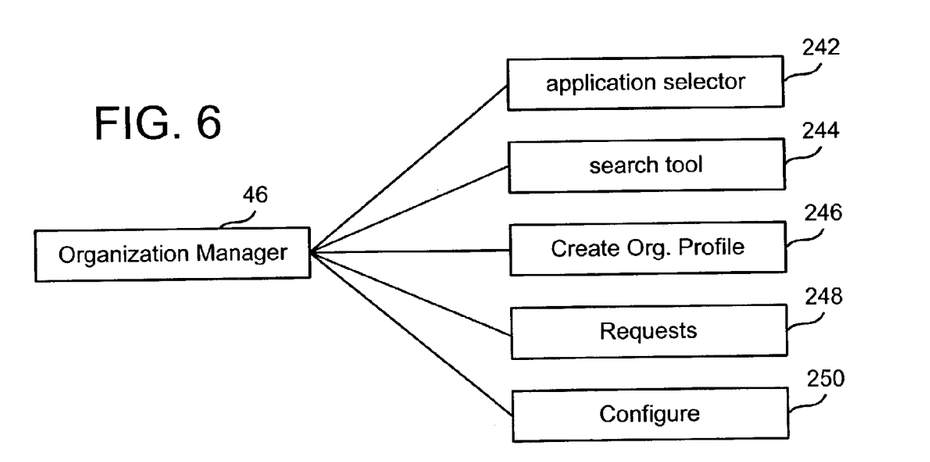
FIG. 6 is a block diagram depicting the Organization Manager.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Figure 7:
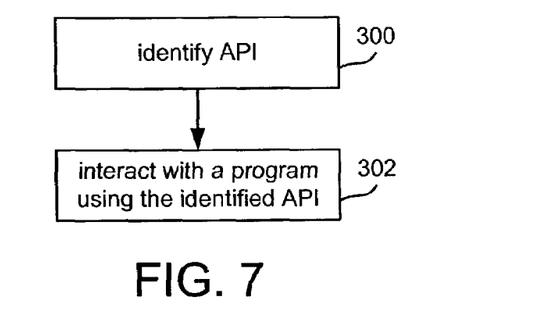
FIG. 7 is a flowchart describing one embodiment of a process for identifying and using an application program interface.

FIG. 7 is a flowchart describing one embodiment of a process for identifying and using an application program interface in an Identity System. Identifying an API is useful when one of the Identity System applications needs to invoke a program outside of the Identity System, such as an encryption or decryption program. Any application in the Identity System may need to take such action, including User Manager 42, Group Manager 44, and Organization Manager 46. Prior to invoking the program, the Identity System application identifies an application program interface to use when interacting with the program (step 300). In one implementation, the Identity System supports multiple application program interfaces and one is identified in step 300.

In one embodiment, the Identity System uses an application program interface registration list to perform step 300. The list correlates application program interfaces to programs. One example of a registration list is a configuration file, as described below with reference to FIG. 8. Another example of a registration list is described below with reference to FIG. 9 as an event catalog. An application program interface registration list is any mechanism that maintains a list correlating application program interfaces to programs. In one implementation, the registration list is distributed among different locations in a database, such as a relational database—allowing the API to program correlation to be performed outside of a single configuration file.

Once the API is identified, the Identity System application interacts with the program using the identified API (step 302). In one implementation, the interaction in step 302 includes the Identity System invoking and exchanging communications with the program. Any of the applications in the Identity System can carry out the process steps shown in FIG. 7.

Figure 8:
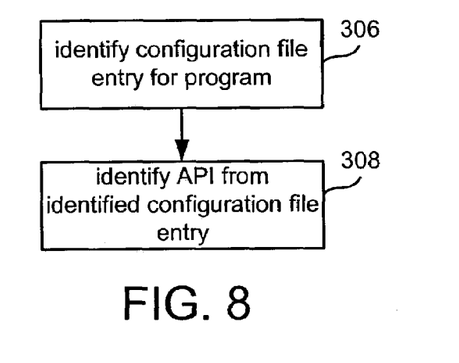
FIG. 8 is a flowchart describing one embodiment of a process for identifying an application program interface using a configuration file.

FIG. 8 is a flowchart describing one embodiment of a process for identifying an application program interface using a registration list in the form of a configuration file. The Identity System includes a configuration file with entries that correlate application program interfaces to programs outside of the Identity System, such as plug-ins. In one embodiment, each entry identifies an outside program that can be invoked by the Identity System and an API for the Identity System to use when interacting with the program. In one implementation, a system administrator maintains the configuration file.

Prior to invoking an outside program, the Identity System uses the configuration file to identify the API that corresponds to the outside program. As shown in FIG. 8, the Identity System identifies an entry in the configuration file that corresponds to the outside program (step 306). The Identity System then identifies the API for the outside program from the entry identified in step 306 (step 308). All of the steps in FIG. 8 can be performed by an application in the Identity Server.

In various embodiments, different circumstances trigger the Identity System to look to the configuration file. In one instance, the Identity System looks to the configuration file in response to the occurrence of an event. The Identity System looks to the configuration file to identify a program that corresponds to the event and an API that corresponds to the program. For example, the reception of data can trigger the Identity System to examine the configuration file—looking for an entry that identifies a program and corresponding API to invoke in response to the reception of data.

Figure 9:
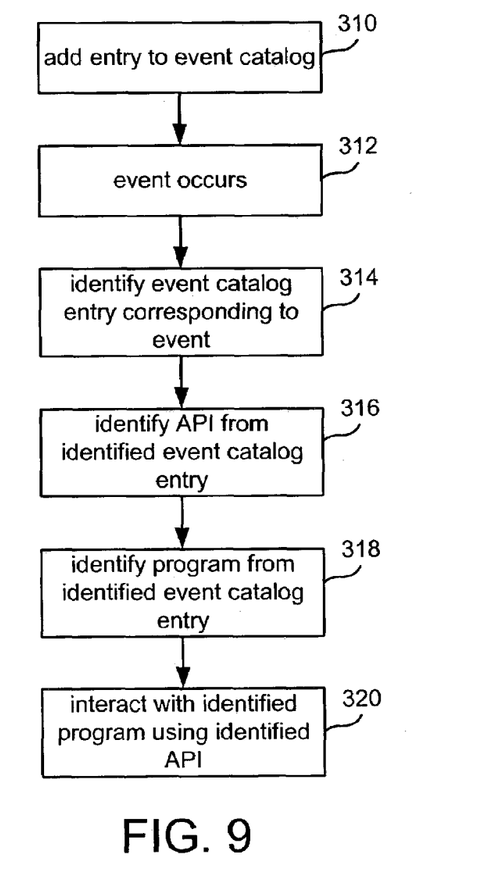
FIG. 9 is a flowchart describing one embodiment of a process for using an event catalog to identify an application program interface.

Another example of a registration list used to correlate events to programs and application interfaces is an event catalog. FIG. 9 is a flowchart describing one embodiment of a process for using an event catalog to identify and use an application program interface. In order to have the Identity System respond to an event, an entry is added to the event catalog that corresponds to the event (step 310). In one embodiment, a system administrator adds the entry.

One implementation of the event catalog contains entries that each correlate an event to a program and a corresponding API. An example entry includes identifiers for an event, a program to invoke in response to the event, and an API to use with the program. In alternate embodiments, the event catalog has different formats. Greater details about the event catalog are provided below.

Once an event occurs (step 312), the Identity System identifies an entry in the event catalog that corresponds to the event (step 314). As described above, each entry lists an event in one embodiment. In some instances, there may not be a corresponding entry and no program will be invoked. After identifying the entry, the Identity System identifies an API corresponding to the event (step 316)—reading the API listed in the identified event catalog entry in one embodiment. The Identity System also identifies a program corresponding to the event (step 318)—reading the program listed in the identified event catalog entry in one embodiment. The Identity System interacts with the program identified in step 318 using the API identified in step 316 (step 320). In interacting with the program, the Identity System invokes the program and exchanges communications with the program according to the identified API. Any application in the Identity System can perform the Identity System steps in FIG. 9.

Although the processes shown in FIGS. 7-9 have been described with reference to an Identity System, these processes can be employed in many different types of systems. For example, these processes can be employed in Access and integrated Identity/Access Systems, as well as other types of systems.

In one implementation, an event catalog is employed to invoke outside programs through the use of a pre and post processing feature of the integrated Identity System and Access System. The pre and post processing allows third parties to extend the base of functionality of the system by providing custom actions based on specific defined events. The base elements of pre and post processing are the events referred to above. Events occur any time the user interacts with the system. Events can be as simple as adding, modifying or deleting an object or could be as complex as a specific step within a workflow process.

Actions are functions or applications that perform a task in response to an event, like the outside programs described above. These actions are defined to enhance the base functionality of the system of FIG. 1. Multiple actions can be defined for each event. Actions are executed in the order that they appear in an event catalog. Actions are defined using a plug-in model similar to Web Server CGI model. Functions are applications defined for each custom action. Each function/application will take a standard XML structure as its parameters that allow the system to specify information about the event that triggered the function. Action functions are defined within libraries (.dll or .so) or stand alone executable files. To create a new action based on an event, one must insert an entry into the event catalog. Entries in one embodiment of the event catalog are defined in the following format:

actionName; exectype; param1, param2, . . . ; path; execparam; func; api;

The "actionName" is the name of the event. The convention for most events is APPNAME_EVENTNAME_PPPTYPE. APPNAME is the name of the application. EVENTNAME is the name of the event. PPPTYPE is the type of processing (pre event or post event). For a workflow, the APPNAME is the workflow ID for the workflow, the EVENTNAME is the step number in the workflow. The "api" identifies an application program interface. The "exectype" is a type of hook, which can be exec or lib. An exec is an executable. A type that is lib is in a library such as a dll. The "param" is the parameter, which the system takes to output the value. The parameters are deliminated by commas. The "path" is the path for the external exc or dll to be launched. The "execparam" identifies the input parameters, deliminated by a comma. The "func" is the function in the shared library. Thus, when the event defined in actionName occurs, the appropriate executable or library function is called using the identified application program interface.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of managing an interface, the method comprising:
    providing, in an Identity System configured to provide identity management services for users on a network, an application program interface registration list comprising a plurality of entries, each of the entries correlating an application program interface to a program outside the Identity System, wherein the Identity System supports a plurality of application program interfaces;
    identifying, in the Identity System, an application program interface corresponding to a program, based at least in part on an entry in the application program interface registration list; and
    invoking said program outside said Identity System in accordance with said identified application program interface.

2. A method according to claim 1, wherein said method further comprises:
    identifying said entry.

3. A method according to claim 2, wherein said entry corresponds to an event.

4. A method according to claim 3, wherein said entry is identified in response to said event.

5. A method according to claim 1, where said method further comprises:
    identifying said program from said entry.

6. A method according to claim 1, wherein said identifying an application program interface is performed by a first application and said program is a client program outside of said first application.

7. A method according to claim 6, wherein said first application is a User Manager application.

8. A method according to claim 1, wherein said identifying an application program interface and said interacting with said program are performed by a first application and said identified application program interface is one of plurality of application program interfaces supported by said first application.

9. A method according to claim 1, wherein said application program interface registration list is an event catalog.

10. A method according to claim 1, wherein said identifying an application program interface is performed by a first application prior to said first application interacting with said program for a first time.

11. A method according to claim 1, wherein said program is a client program outside of said Identity System.

12. A method according to claim 1, wherein said method is performed as part of an Access System.

13. A method according to claim 12, wherein said program is a client program outside of said Access System.

14. A method according to claim 12, wherein said Identity system is integrated with said Access System.

15. A method according to claim 14, wherein said program is a client program outside of said integrated Identity/Access System.

16. A method according to claim 1, wherein providing identity management services for users on a network comprises managing a plurality of identity profiles, each of the identity profiles being associated with a user.

17. A method according to claim 16, wherein each identity profile comprises a plurality of attributes.

18. A method according to claim 16, wherein managing a user profile comprises allowing a user to create a new user identity profile.

19. A method according to claim 1, wherein said Access System is configured to provide security for one or more resources across one or more web servers.

20. A method according to claim 1, wherein said Access System is further configured to perform authentication and authorization of users.

21. A method according to claim 1, wherein said program is an encryption program.

22. A method according to claim 1, wherein the plurality of interfaces comprise first application program interface that is compatible with a prior version of the Identity System and a second application program interface that supports additional functionality in a new version of the Identity System.

23. One or more processor readable storage devices having processor readable code embodied on said one or more processor readable storage devices, said processor readable being executable by one or more processors and comprising:

code for providing, in an Identity System configured to provide identity management services for users on a network, an application program interface registration list comprising a plurality of entries, each of the entries correlating an application program interface to a program outside the Identity System, wherein the Identity System supports a plurality of application program interfaces;

code for identifying, in the Identity System, an application program interface corresponding to a program, based at least in part on an entry in the application program interface registration list; and     code for invoking said program outside said Identity System in accordance with said identified application program interface.

24. One or more processor readable storage devices according to claim 23, wherein said processor readable code further comprises:

code for identifying said entry.

25. One ore more processor readable storage devices according to claim 24, wherein said entry corresponds to an event, wherein said entry is identified in response to said event.

26. One or more processor readable storage devices according to claim 23, wherein said processor readable code further comprises:

code for identifying said program from said entry.

27. One or more processor readable storage devices according to claim 23, wherein a first application comprises said code for identifying an application program interface, and said program is a client program outside of said first application.

28. One or more processor readable storage devices according to claim 23, wherein a first application comprises said code for identifying an application program interface, and wherein said application program interface is identified prior to said first application interacting with said program for a first time.

29. One or more processor readable storage devices according to claim 23, wherein said processor readable code is executed by an Access System.

30. One or more processor readable storage devices according to claim 29, wherein said Access System is integrated with said Identity System.

31. An Identity System configured to provide identity management services for users on a network, the Identity System comprising:

one or more storage devices having processor readable code embodied on said one or more storage devices; and     one or more processors in communication with said one or more storage devices, wherein said processor readable code is executable by said one or more processors, said processor readable code comprising:

code for providing, in an Identity System configured to provide identity management services for users on a network, an application program interface registration list comprising a plurality of entries, each of the entries correlating an application program interface to a program outside the Identity System, wherein the Identity System supports a plurality of application program interfaces;

code for identifying, in said Identity System, an application program interface corresponding to a program, based at least in part on an entry in the application program interface registration list; and         code for invoking said program outside said Identity System in accordance with said identified application program interface.

32. An Identity System according to claim 31, wherein said processor readable code further comprises:

code for identifying said entry, wherein said entry corresponds to an event, wherein said entry is identified in response to said event.

33. An Identity System according to claim 31, wherein said application program interface is identified prior to interacting with said program for a first time.

34. A method of managing an interface, the method comprising:

identifying, in an Identity System, an entry in a configuration file, wherein said Identity System is configured to provide identity management services for users on a network, and wherein said configuration file comprises an application program interface registration list comprising a plurality of entries, each of the entries correlating an application program interface to a program outside the Identity System, wherein the Identity System supports a plurality of application program interfaces; and     identifying an application program interface from said entry, wherein said application program interface is used to invoke a program outside the Identity System.

35. A method according to claim 34, wherein said configuration file is an event catalog.

36. A method according to claim 35, wherein said entry corresponds to an event.

37. A method according to claim 35, wherein:

the event catalog comprises a plurality of event catalog entries, and wherein each event catalog entry comprises an identifier for an event, an identifier for a program to invoke in response to the event, and an identifier for an API to use with the program;

identifying an entry in a configuration file comprises identifying an event catalog entry, based on the event; and     identifying an application program interface comprises identifying, from the event catalog entry, a program to invoke in response to the event and an application program interface to use with the identified program.

38. A method according to claim 34, wherein said entry corresponds to an event and said method further comprises:

interacting with said program corresponding to said event using said application program interface.

39. A method according to claim 38, wherein said identifying an entry and said identifying an application program interface are performed by a first application and said identified application program interface is one of a plurality of application program interfaces supported by said first application.

40. A method according to claim 38, wherein said method further comprises:

identifying said program from said entry.

41. A method according to claim 40, wherein said entry specifies said program.

42. A method according to claim 34, wherein said entry specifies said application program interface.

43. A method according to claim 34, wherein said method is performed as part of an Access System.

44. A method according to claim 43, wherein said Access System is integrated with said Identity System.

45. One or more processor readable storage devices having processor readable code embodied on said one or more processor readable storage devices, said processor readable code being executable by one or more processors and comprising:

code for identifying, in an Identity System, an entry in a configuration file, wherein said Identity System is configured to provide identity management services for users on a network, and wherein said configuration file comprises an application program interface registration list comprising a plurality of entries, each of the entries correlating an application program interface to a program outside the Identity System, wherein the Identity System supports a plurality of application program interfaces; and code for identifying an application program interface from said entry, wherein said application program interface is used to invoke a program outside the Identity System.

46. One or more processor readable storage devices according to claim 45, wherein said entry corresponds to an event and said processor readable code further comprises:

code for interacting with said program corresponding to said event using said application program interface.

47. One or more processor readable storage devices according to claim 46, wherein said processor readable code further comprises:

code for identifying said program from said entry.

48. An Identity System configured to provide identity management services for users on a network, the Identity System comprising:

one or more storage devices having processor readable code embodied on said one or more storage devices; and one or more processors in communication with said one or more storage devices, wherein said processor readable code is executable by said one or more processors, said processor readable code comprising:

code for identifying an entry in a configuration file, wherein said configuration file comprises an application program interface registration list comprising a plurality of entries, each of the entries correlating an application program interface to a program outside the Identity System, wherein the Identity System supports a plurality of application program interfaces; and code for identifying an application program interface from said entry, wherein said application program interface is used to invoke a program outside the Identity System.

49. An Identity System according to claim 48, wherein said entry corresponds to an event and said processor readable code further comprises:

code for interacting with said program corresponding to said event using said application program interface; and code for identifying said program from said entry.

50. A method of managing an interface, comprising the steps of:

identifying, in an Identity System, an application program interface in a plurality of application program interfaces, wherein said application program interface corresponds to a program outside said Identity System, and wherein said Identity System is configured to provide identity management services for users on a network; and invoking said program in accordance with said identified application program interface, wherein said application program interface is identified prior to invoking said program for a first time.

51. A method according to claim 50, wherein identifying an application program interface comprises:

identifying said application program interface, based at least in part on a configuration file, wherein said configuration file contains an entry correlating said program to said application program interface.

52. A method according to claim 51, wherein identifying an application program interface comprises:

identifying said application program interface from said entry.

53. A method according to claim 52, further comprising:

identifying said entry in response to an event; and identifying said program from said entry.

54. A method according to claim 53, wherein said configuration file is an event catalog.

55. A method according to claim 50, wherein said application program interface is identified by a first application and said program is a client program outside of said first application.

56. A method according to claim 50, wherein said method is performed as part of an Access System.

57. One or more processor readable storage devices having processor readable code embodied on said one or more processor readable storage devices, said processor readable being executable by one or more processors and comprising:

code for identifying, in an Identity System, an application program interface in a plurality of application program interfaces, wherein said application program interface corresponds to a program outside said Identity System, and wherein said Identity System is configured to provide identity management services for users on a network; and code for invoking said program in accordance with said identified application program interface, wherein said application program interface is identified prior to invoking said program for a first time.

58. One or more processor readable storage devices according to claim 57, wherein said code for identifying an application program interface comprises:

code for identifying said application program interface, based at least in part on a configuration file, wherein said configuration file contains an entry correlating said program to said application program interface.

59. One or more processor readable storage devices according to claim 58, wherein:

said code for identifying an application program interface further comprises:

code for identifying said application program interface from said entry, and said processor readable code further comprises:

code for identifying said entry in response to said event; and code for identifying said program from said entry.

60. One or more processor readable storage devices according to claim 57, wherein said application program interface is identified by a first application and said program is a client program outside of said first application.

61. An Identity System configured to provide identity management services for users on a network, the Identity System comprising:

one or more storage devices having processor readable code embodied on said one or more storage devices; and one or more processors in communication with said one or more storage devices, wherein said processor readable code is executable by said one or more processors, said processor readable code comprising:

code for identifying, in said Identity System, an application program interface in a plurality of application program interfaces, wherein said application program interface corresponds to a program outside said Identity System; and code for invoking said program in accordance with said identified application program interface wherein said application program interface is identified prior to invoking said program for a first time.

62. An Identity System according to claim 61, wherein said code for identifying an application program interface comprises:
  code for identifying said application program interface, based at least in part on a configuration file, wherein said configuration file contains an entry correlating said program to said application program interface.

63. An Identity System according to claim 62, wherein:
said code for identifying an application program interface further comprises:
  code for identifying said application program interface from said entry, and said processor readable code further comprises:
  code for identifying said entry in response to an event; and
  code for identifying said program from said entry.

* * * * *

UNITED STATES PATENT AND TRADEMARK OFFICE
CERTIFICATE OF CORRECTION

| | | |
|---|---|---|
| PATENT NO. | : 7,478,407 B2 | Page 1 of 1 |
| APPLICATION NO. | : 10/325465 | |
| DATED | : January 13, 2009 | |
| INVENTOR(S) | : Jain et al. | |

It is certified that error appears in the above-identified patent and that said Letters Patent is hereby corrected as shown below:

On the Title Page,
On page 3, under "Other Publications", Item (56), line 7, delete "Verson" and insert -- Version --, therefor.

In column 15, line 22, in Claim 25, delete "ore" and insert -- or --, therefor.

Signed and Sealed this

Fourth Day of May, 2010

David J. Kappos
*Director of the United States Patent and Trademark Office*